May 19, 1964

W. W. MAYFIELD ETAL 3,133,599

FLEXIBLE TRACTOR BORNE PLANTER

Filed Nov. 16, 1962

INVENTORS.
WAYNE W. MAYFIELD,
GEORGE W. MAYFIELD,
BY

McMorrow, Berman & Davidson
ATTORNEYS.

INVENTORS
WAYNE W. MAYFIELD,
GEORGE W. MAYFIELD,
BY
McMorrow, Berman & Davidson
ATTORNEYS.

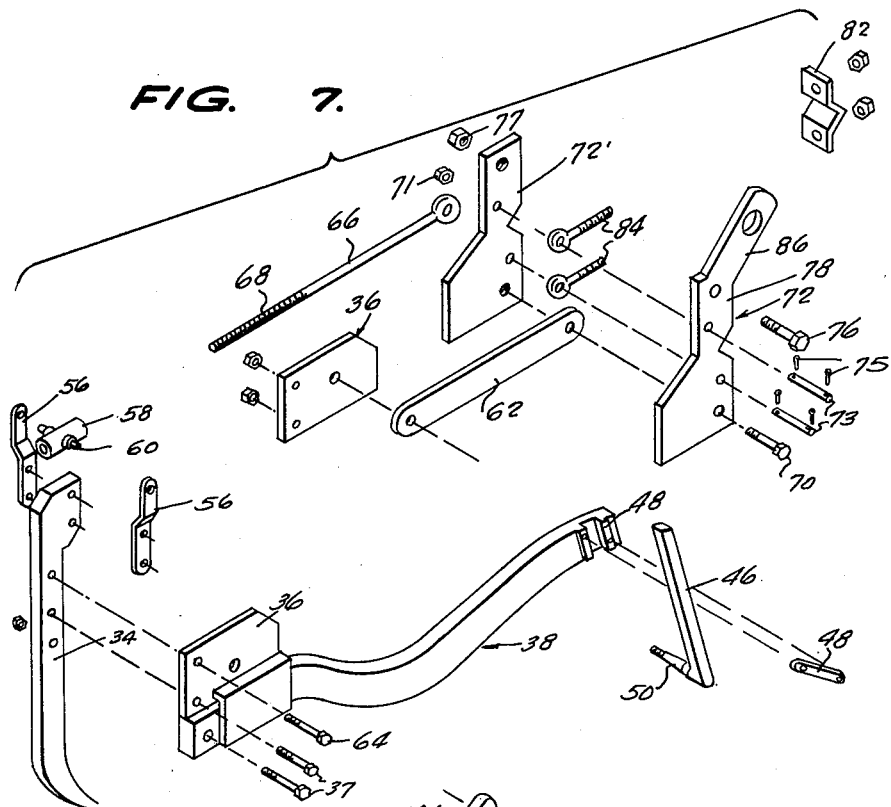

3,133,599
FLEXIBLE TRACTOR BORNE PLANTER
Wayne W. Mayfield and George W. Mayfield, both of Rte. 3, Stamford, Tex.
Filed Nov. 16, 1962, Ser. No. 238,116
2 Claims. (Cl. 172—448)

This invention relates to a novel flexible tractor borne planter or bedder, and more particularly to novel plow assemblies which have flexible and adjustable mounting means to a tractor, and which positively restrict the sweeps or plows thereof to operation in the ground or earth at a predetermined uniform depth despite irregularities in the surface of the ground traversed by the plow assemblies.

The primary object of the invention is the provision of efficient, uncomplex, and inexpensive plow assemblies of the character indicated above which are adapted to be supported on and secured to tool bar means extending laterally from a tractor, at the rear end of the tractor, have ground-engaging guide wheels positioned forwardly of the tool bar means and in line with their sweeps or plows, and have flexible parallelogram mounting means which are connected to adjusting means present on the tractor, for adjusting the horizontal angle of their plows and guide wheels, relative to the tractor, or the assemblies contain hydraulic adjusting means supplied with fluid under pressure from the tractor.

Another object of the invention is the provision of plow assemblies of the character indicated above to which a variety of planters can be attached.

A further object of the invention is the provision of a planter which comprises a plow assembly of the character indicated above, in conjunction with a planting assembly connected to and extending behind the assembly, the planting assembly comprising a rigidly supported seed hopper and shoe, in line with the plow or sweep of the plow assembly, a pair of covering wheels behind the shoe, a pair of toothed rotor wheels trailing and in line with the covering wheels, the rotor wheels being hingedly mounted, and a pair of drags trailing the rotor wheels.

Other important objects and advantageous features of the invention will be apparent from the following description and the accompanying drawings, wherein, for purposes of illustration only, specific forms of the invention are set forth in detail.

In the drawings:

FIGURE 3 is an enlarged vertical longitudinal section taken on the line 3—3 of FIGURE 2;

FIGURE 4 is a top plan view of FIGURE 3;

FIGURE 7 is an enlarged exploded perspective view of FIGURE 5; and,

FIGURE 8 is an enlarged exploded perspective view of the hydraulic cylinder and associated levers.

Figures 1, 2:
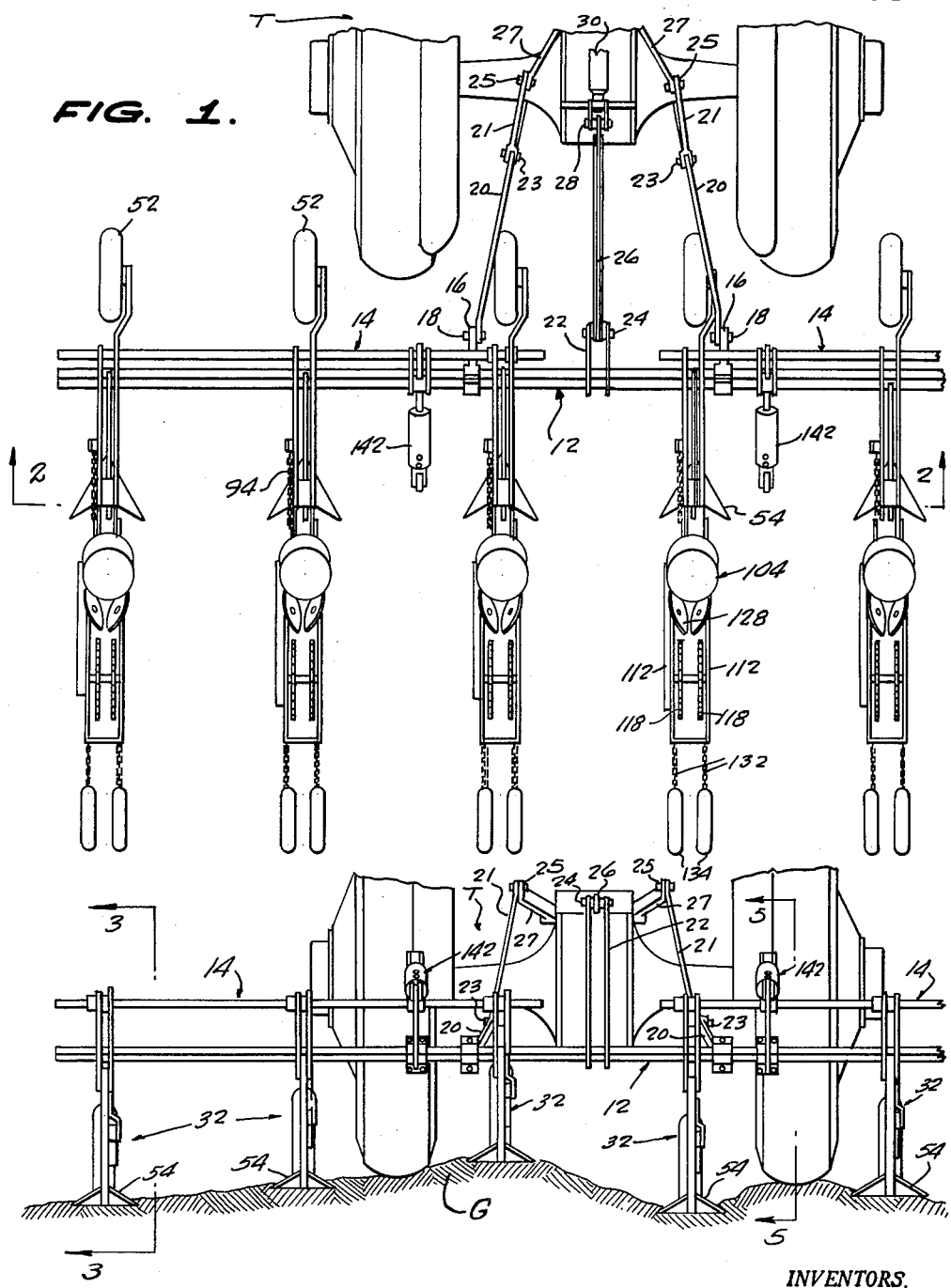
FIGURE 1 is a top plan view of a gang planter composed of a plurality of plow assemblies and planting assemblies mounted to and trailing a tractor, in accordance with the present invention.
FIGURE 2 is a vertical transverse section taken on the line 2—2 of FIGURE 1.

Referring in detail to the drawings, wherein like and related parts are designated by like and related numerals throughout the several views, and first to FIGURES 1 through 4, a tractor T is shown which has therebehind, and extending to opposite sides thereof, a lower main polygonal tool bar 12. A pair of spaced upper polygonal tool bars 14 are spaced above and forwardly of the lower tool bar 12 but are not part of the tractor. The main or lower tool bar 12 is rotatably carried by short bars 16 which are hinged, as indicated at 18, to the rear ends of drawbars 20 extending rearwardly from the tractor. The drawbars 20 are operated by links 21 pivoted thereto, as indicated at 23, which lead from and are pivoted, at 25, to hydraulically operated levers 27 on the tractor T. The main tool bar 12 is positioned and rotated by a clevis 22 embracing the midlength point, which is pivoted at its upper end, as indicated at 24, to the rear end of a link 26, which is pivoted, at its forward end, as indicated at 28, to the piston of a hydraulic cylinder 30 on the tractor T.

Figures 3, 4:
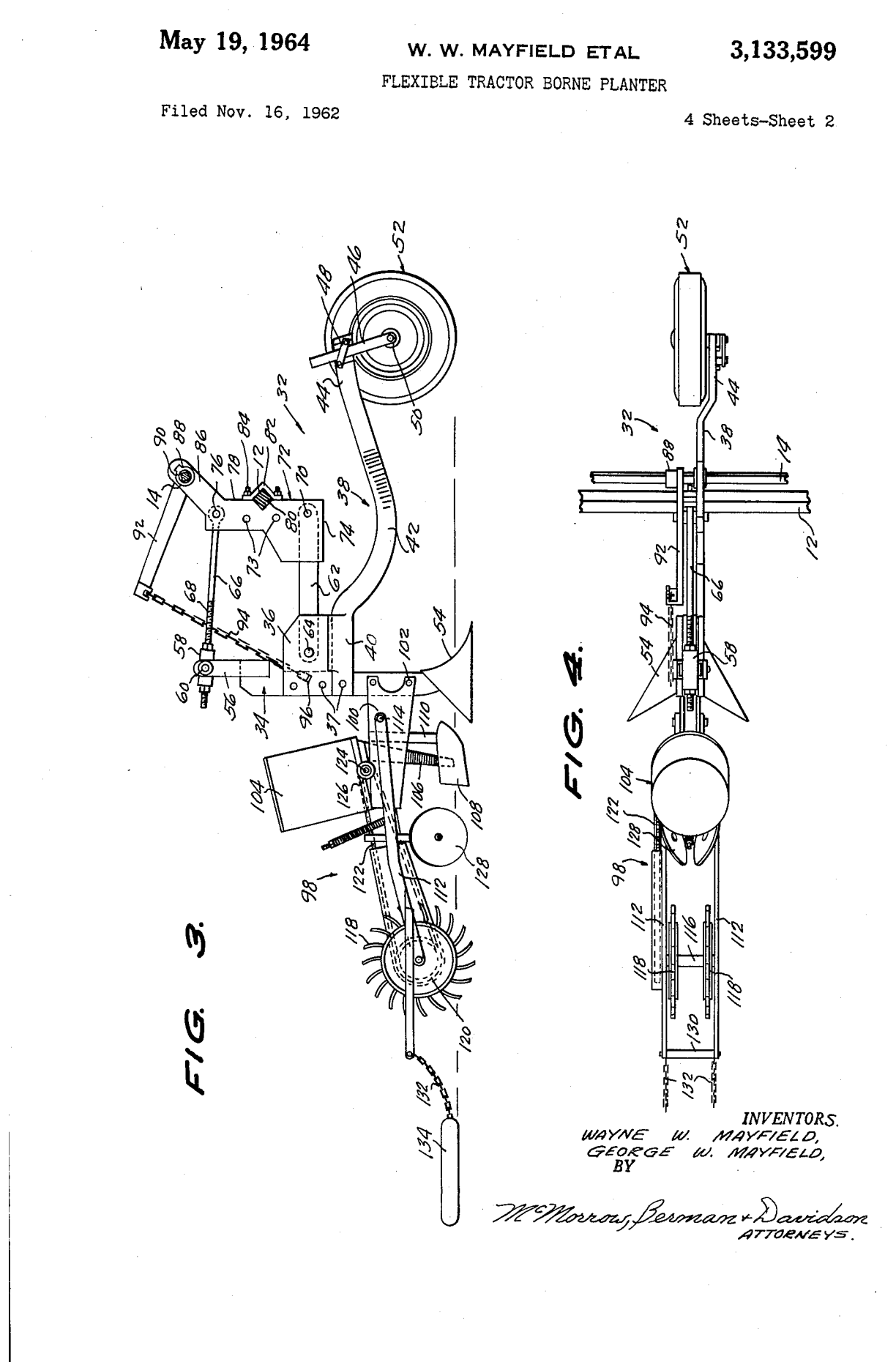

Each of the plow assemblies, generally designated 32, which can be installed in desired even or odd numbers at the opposite sides of the tractor T, comprises, as shown in FIGURE 3, a vertically elongated plow beam 34, having forwardly extending bracket plates 36, spaced downwardly from its upper end, and disposed in a vertical plane. The plates 36 are secured in place by bolts 37. A forwardly extending guide wheel arm 38 has a horizontal rear end portion 40 suitably fixed to the beam 34 and engaged with the lower edge of the plate 36, a downwardly bowed middle portion 42, and an upwardly angled and laterally offset forward end portion 44. A forwardly and downwardly angled strut 46 is mounted, as indicated at 48, to the forward end portion 44 for vertical adjustment relative thereto, and has, at its lower end, a lateral stub shaft 50, on which is journaled a preferably rubber-tired guide wheel 52, which is in line with the plow beam 34, and a plow or sweep 54, fixed on the lower end of the beam.

A pair of laterally spaced vertically elongated brackets 56 are fixed to the plow beam 34, above the plates 36 and extend upwardly beyond the upper end of the beam, and a threaded sleeve 58 is positioned between and pivoted to the brackets, at their upper end, as indicated at 60. A normally horizontal lower lever 62 is pivoted, at its rear end, as indicated at 64, to the plate 36, at a point near the beam 34, and an upper lever in the form of a rod 66 has a threaded rear end portion 68 which is threaded through the sleeve 58.

The lower level 62 is pivoted, at its forward end, as indicated at 70, to a vertically elongated carrier plate 72, at a point near the lower edge 74 thereof and forwardly displaced from the rear edge of the carrier plate, substantially in vertical alignment with the pivotal connection 76 of the forward end of the upper lever rod 66, to the carrier plate, whereby, as shown in FIGURE 3, the upper lever rod 66 declines forwardly at a slight angle to the lower lever 62, with the carrier plate 72 in a substantially erect position, parallel to the plow beam 34. A second carrier plate 72′ is engaged with the side of the plate 72 and is secured thereto by pins 73, having cotter pins 75 on their ends, the rod lever 66 being pivoted on an upper bolt 76, between the two plates. A nut 71 is provided for the bolt 70, and a nut 77 for the bolt 76.

The forward edge 78 of the carrier plate 72 is formed midway between its upper and lower ends, with a V-shaped notch 80, which conformably receives one side of the main tool bar 12, which is clamped therein by means of a V-shaped fitting 82, held in place by eye bolts 84 threaded into the carrier plate. On the upper end of the carrier plate is a pair of spaced forwardly and upwardly angled arms 86 which have journaled therebetween, at their upper ends, a sleeve 88, having a polygonal bore 90, through which an upper tool bar 14 extends. A rearwardly and upwardly angled lever 92 is fixed, at its forward end, to the sleeve 88, and has connected to its rear end, a pendant chain 94, which extends at a rearward and downward angle to the bracket plate 36, to which it is adjustably connected, as by engagement of a selected link thereof over a hook 96, on one side of the plate 36. The beam 34, the lower lever 62, the upper lever rod 66, and the carrier plate 72, form a parallelogram, by means of which vertical movements of the guide wheel 52, produced by contact thereof with uneven ground, produce vertical movements of the plow beam 34, and consequently its plow 54, in a straight perpendicular line, relative to the tractor T, and the ground G, whereby the plow 54 is caused to maintain the same selected depth in the ground, despite rises and falls of the surface of the ground, as indicated in FIGURE 2. Over-all positioning of the plow assembly 32 is determined by the rotary adjustment of the main tool bar 12 by means of the controls therefor present on the tractor T.

A planting assembly 98 trails the plow assembly 32, and comprises a pair of spaced horizontally elongated support plates 100 fixed to the opposite sides of the beam 34, as indicated at 102, between the bracket plate 36 and the plow 54, and extending rearwardly from the beam. A hopper 104, adapted to contain seed, fertilizer, or the like, is mounted upon the support plates 100 and has a downwardly extending discharge tube 106, which discharges into a shoe 108, which declines rearwardly relative to the horizontal, and is carried by a vertical strut 110 which is fixed to the support plates, forwardly of the hopper 104.

A pair of spaced longitudinally elongated, rearwardly and downwardly angled bars 112 are pivoted, at their forward ends, as indicated at 114, to the outer sides of the support plates 100, forwardly of the hopper 104, and have an axle 116 extending between them adjacent to their rear ends, on which a pair of spaced spiral-toothed rotor wheels 118 are journaled. One of the rotor wheels 118 has a sprocket wheel 120 which is operatively connected by a sprocket chain 122 to a sprocket wheel 124, on the shaft 126 of rotary valving means (not shown) in the lower end of the hopper 104, whereby this valving means is driven as the assembly 98 is moved forward along the ground.

A pair of upwardly divergent and rearwardly convergent covering discs or wheels 128 are positioned between the shoe 108 and the rotor wheels 118, the space between the covering wheels being aligned with the plow 54. The bars 112, as shown in FIGURE 4, are spaced and connected, at their rear ends, by a spacer bar 130, to which a pair of spaced drag chains 132 are connected, at their forward ends, individual cylindrical drags 134 trail the chains 132 and have their forward ends secured to the rear ends of these chains.

Figure 5:
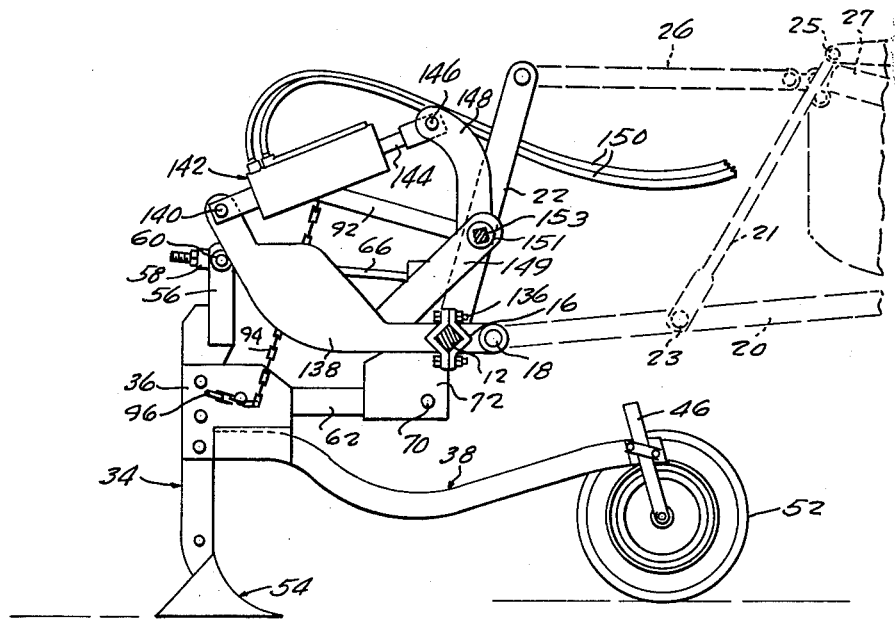
FIGURE 5 is a vertical longitudinal section taken on the line 5—5 of FIGURE 2.
Figure 6:
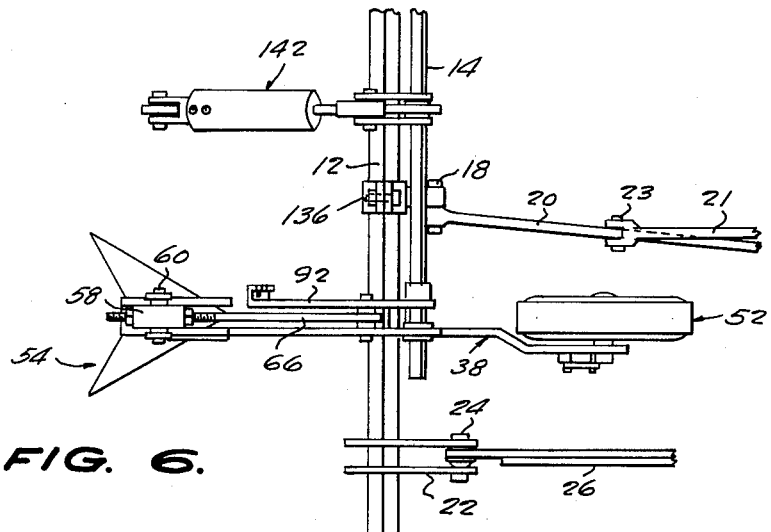
FIGURE 6 is a fragmentary top plan view of FIGURE 5.

Between adjacent plow assemblies 32 the main tool bar 12 has clamped thereon, as indicated at 136, in FIGURES 5, 6 and 2, a rearwardly and upwardly angled lever 138, to whose elevated rear end is pivoted, as indicated at 140, the rear end of a hydraulic cylinder 142, having a forwardly extending piston rod 144. The piston rod 144 is pivoted, as indicated at 146, to the upper end of a pair of spaced vertical links 148 which are suitably fixed, at their lower ends, to related upper tool bars 14. The lever 138 has an upwardly and forwardly angled arm 149 thereon which has, at its upper end, a fixed sleeve 151 having a polygonal bore 153 which conformably receives a related upper tool bar 14. The cylinders 142 are extended and contracted by means of fluid supplied thereto by hoses 150, leading from the tractor T, and hydraulic control means thereon (not shown).

In operation, the assembly 32 being in forward motion, the plow 54 forms a furrow of uniform depth in the ground G, into which seed or the like is deposited by the shoe 108. The covering wheels 128 then act to move earth laterally inwardly over the furrow and the seeds or the like therein. The drags 134 then act to smooth the surface of the ground, along opposite sides of the covered furrow and push earth over the furrow.

As indicated in FIGURE 2, the plow assemblies 32, at opposite sides of the tractor T can be set at different or the same levels, and the plow assemblies 32 are adapted to rise and fall, independently of each other, in accordance with the contours of the ground encountered.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tractor having a lower lateral main tool bar, arm means on the tractor rotatively supporting the main tool bar, a plow assembly comprising an upper tool bar spaced above the lower tool bar, a carrier plate non-rotatably carried by the main tool bar, said upper tool bar being journaled on the carrier plate, spaced upper and lower levers pivoted at their forward ends to the carrier plate at vertically-spaced points and at locations spaced below the upper tool bar, a vertical plow beam to which the rear ends of the levers are pivoted at vertically-spaced points, said plow beam, said levers, and said carrier plate being in parallelogram relationship, a plow on the lower end of the plow beam, a guide wheel arm fixed at its rear end to the plow beam and having a ground-engaging guide wheel on its forward end, a rearwardly-inclined lever fixed to the upper tool bar and extending upwardly therefrom, and means adjustably connecting the inclined lever at its rear end to the plow beam, said upper tool bar having an upstanding lever fixed thereon and said lower tool bar has a rearwardly extending lever fixed thereon, and a hydraulic cylinder extending between and pivotally connected to the upstanding lever and the rearwardly extending lever.

2. In combination, a tractor having a lower lateral main tool bar, arm means on the tractor rotatably supporting the main tool bar, a plow assembly comprising an upper tool bar spaced above the lower tool bar, a carrier plate non-rotatably carried by the main tool bar, said upper tool bar being journaled on the carrier plate, spaced upper and lower levers pivoted at their forward ends to the carrier plate at vertically-spaced points and at locations spaced below the upper tool bar, a vertical plow beam to which the rear ends of the levers are pivoted at vertically-spaced points, said plow beam, said levers, and said carrier plate being in parallelogram relationship, a plow on the lower end of the plow beam, a guide wheel arm fixed at its rear end to the plow beam and having a ground-engaging guide wheel on its forward end, a rearwardly-inclined lever fixed to the upper tool bar and extending upwardly therefrom, and means adjustably connecting the inclined lever at its rear end to the plow beam, said upper tool bar having an upstanding lever fixed thereon and said lower tool bar has a rearwardly extending lever fixed thereon, and a hydraulic cylinder extending between and pivotally connected to the upstanding lever and the rearwardly extending lever, said connecting means comprising a chain having links, a hook on the plow beam over which a chain link is adapted to be engaged.

References Cited in the file of this patent

UNITED STATES PATENTS

| | | |
|---|---|---|
| 544,737 | Mannewitz | Aug. 20, 1895 |
| 1,962,349 | Johnson | June 12, 1934 |
| 2,031,650 | Hendricks | Feb. 25, 1936 |
| 2,337,662 | Johnson | Dec. 28, 1943 |
| 2,354,886 | Silver | Aug. 1, 1944 |
| 2,737,868 | Morakoski | Mar. 13, 1956 |
| 2,925,871 | Gillett | Feb. 25, 1960 |
| 2,931,446 | Givinn | Apr. 5, 1960 |
| 2,974,736 | Silver | Mar. 14, 1961 |
| 3,049,181 | Oerman | Aug. 14, 1962 |

FOREIGN PATENTS

| | | |
|---|---|---|
| 797,923 | Great Britain | July 9, 1958 |